United States Patent [19]

Goko et al.

[11] Patent Number: 4,978,722

[45] Date of Patent: Dec. 18, 1990

[54] METHOD FOR PRODUCING A PROPYLENE-α-OLEFIN BLOCK COPOLYMER

[75] Inventors: Nobuaki Goko; Yumito Uehara; Hideshige Kato; Yukimasa Matsuda, all of Kurashiki, Japan

[73] Assignee: Mitsubishi Kasei Corporation, Tokyo, Japan

[21] Appl. No.: 407,698

[22] Filed: Sep. 15, 1989

Related U.S. Application Data

[63] Continuation of Ser. No. 167,105, Mar. 11, 1988, abandoned.

[30] Foreign Application Priority Data

| Mar. 14, 1987 | [JP] | Japan | 62-59774 |
| Mar. 14, 1987 | [JP] | Japan | 62-59775 |
| May 18, 1987 | [JP] | Japan | 62-120385 |
| May 18, 1987 | [JP] | Japan | 62-120386 |

[51] Int. Cl.$^5$ .................................. C08F 297/08
[52] U.S. Cl. .................................. 525/255; 525/249; 525/256; 525/259; 525/262; 525/268; 525/323; 525/53
[58] Field of Search ............... 525/255, 259, 262, 268, 525/53, 249

[56] References Cited

U.S. PATENT DOCUMENTS

| 4,015,060 | 3/1977 | Karazannis | 526/141 |
| 4,284,738 | 8/1981 | Zukowski | 525/247 |
| 4,304,890 | 12/1981 | Suzuki | 526/87 |
| 4,334,041 | 6/1982 | Zukowski | 525/53 |
| 4,414,132 | 11/1983 | Goodall et al. | 526/125 |
| 4,483,966 | 11/1984 | Suzuki | 525/323 |
| 4,543,389 | 9/1985 | Burstain et al. | 525/53 |
| 4,739,015 | 4/1988 | Toyota et al. | 525/259 |
| 4,771,103 | 9/1988 | Chiba et al. | 525/268 |

FOREIGN PATENT DOCUMENTS

| 0013837 | 8/1980 | European Pat. Off. |
| 117298 | 2/1988 | Japan. |

OTHER PUBLICATIONS

Allowed claims of Taiwan Publication No. 42779 (8/81).

*Primary Examiner*—Carman J. Seccuro
*Attorney, Agent, or Firm*—Oblon, Spivak, McClelland, Maier & Neustadt

[57] ABSTRACT

A method for producing a propylene-α-olefin block copolymer, which comprises polymerizing propylene in the presence of a catalyst and then polymerizing in a gas phase an α-olefin other than propylene, or propylene and other α-olefin without deactivating the catalyst, wherein at least one compound selected from the group consisting of an aromatic carboxylic acid ester, a phosphorous ester, an unsaturated dicarboxylic acid diester, an amine compound and an amide compound, is supplied to the latter gas phase polymerization system.

16 Claims, No Drawings

METHOD FOR PRODUCING A PROPYLENE-α-OLEFIN BLOCK COPOLYMER

This application is a continuation of application Ser. No. 07/167,105, filed on Mar. 11, 1988, now abandoned.

The present invention relates to a method for producing a propylene-α-olefin block copolymer. More particularly, it relates to a method for producing such an α-olefin block copolymer in a high reactor volumetric efficiency by subjecting a propylene polymer obtained without deactivating a catalyst, to polymerization with other α-olefin or to copolymerization of propylene and other α-olefin in a gas phase, without leading to adhesion of polymer particles to one another or to the inner wall of the reactor or clogging of the pipes or agglomeration in a silo or hopper in the subsequent steps.

For the polymerization of an α-olefin such as ethylene or propylene, the performance of the polymerization catalyst has been remarkably improved in recent years, and the yield of the polymer per the catalyst component has been remarkably improved, whereby the transition metal catalyst component remaining in the formed polymer can be reduced sufficiently so that a step of removing the catalyst can be omitted.

On the other hand, methods for the polymerization of such α-olefins include a slurry polymerization method wherein polymerization is conducted in an inert hydrocarbon solvent, a bulk polymerization method wherein polymerization is conducted in a liquefied monomer such as liquefied propylene, and a gas phase polymerization method wherein polymerization is conducted in a gas phase. In recent years, attention has been drawn to the gas phase polymerization since it requires no solvent whereby no recovery or purification step is required for a solvent and the recovery of the monomer and the drying of the polymer product are easy.

In the field of block copolymers of propylene with other α-olefin, a gas phase block copolymerization method is known wherein a propylene polymer is produced in a first step and other α-olefin is polymerized or propylene and other α-olefin are copolymerized in a second step in a gas phase.

In addition to the above-mentioned economical advantage over the method wherein the second step polymerization is conducted in an inert hydrocarbon solvent or in liquefied propylene, the gas phase block copolymerization method has a further advantage that a variety of products can thereby be obtained.

However, it has been pointed out that the gas phase polymerization method involves various difficulties such that the monomer concentration is relatively low and the reaction rate is accordingly low and that it is required to use a catalyst having excellent catalytic activities and excellent granularity in order to form a satisfactory fluidized layer, as well as problems relating to the apparatus for satisfactory flowability and mixing, and problems concerned with heat removal and with adhesion or deposition. In particular, the adhesion or deposition within the reactor not only creates a serious trouble against stabilized operation for a long period of time but also brings about a deterioration of the quality of the product.

In order to overcome the problem of adhesion of the polymer particles to one another, it has been proposed in Japanese Unexamined Pat. Publications No. 151713/1981 and No. 213012/1983 to add an alkoxyaluminum compound during the propylene-α-olefin copolymerization for the purpose of reducing the adhesion. However, such a method has a difficulty that the desired effect can not be obtained unless a large amount of the alkoxyaluminum compound is added relative to the alkylaluminum compound catalyst component used for the polymerization. Further, in order to overcome the difficulty of this method, it has been proposed in Japanese Unexamined Pat. Publication No. 69821/1986 to add, instead of the alkoxyaluminum compound, an active hydrogen compound such as an alcohol to the copolymerization system and to react it with an alkylaluminum compound present in the system to form an alkoxyaluminum compound in situ, whereby excellent effects are obtainable as compared with the above method. However, this publication fails to indicate any method for the prevention of adhesion of the polymer to the inner wall of the polymerization reactor.

The present inventors have studied extensively the causes for and measures to deal with the phenomenon of the deterioration of the powder properties and the phenomenon of the adhesion particularly in the reactor for the second step gas phase copolymerization of propylene-α-olefin. As a result, it has been found that a low molecular weight polymer of ethylene or propylene is likely to form by the action of the organoaluminum component used as a cocatalyst in the gas phase polymerization reactor and in the gas circulation system thereof, and in some cases, an oily substance forms, and that such a low molecular weight polymer causes a deterioration of the powder properties and the phenomenon of adhesion or agglomeration in the reactor.

Under the circumstances, the present inventors have conducted various studies for a method of suppressing the formation of such a low molecular weight polymer and, as a result, have found it possible to suppress the formation of the low molecular weight polymer and thus to prevent the deterioration of the powder properties and the adhesion or agglomeration in the reactor without adversely affecting the polymerization reaction by supplying a certain specific compound to the second step gas phase polymerization reaction system. The present invention has been accomplished on the basis of this discovery.

The present invention provides a method for producing a propylene-α-olefin block copolymer, which comprises polymerizing propylene in the presence of a catalyst and then polymerizing in a gas phase an α-olefin other than propylene, or propylene and other α-olefin without deactivating the catalyst, wherein at least one compound selected from the group consisting of an aromatic carboxylic acid ester, a phosphorous ester, an unsaturated dicarboxylic acid diester, an amine compound and an amide compound, is supplied to the latter gas phase polymerization system.

Now, the present invention will be described in detail with reference to the preferred embodiments.

The polymerization catalyst used in the present invention comprises a titanium-containing solid catalyst component and an organoaluminum compound. However, there is no particular restriction, and conventional catalysts may be employed.

As the titanium-containing solid catalyst component, a conventional carrier-supported type catalyst component containing a solid magnesium compound, a titanium compound component and a halogen component, may be used. However, it is preferably a catalyst component comprising titanium trichloride as the main component. As the catalyst component comprising titanium trichloride as the main component, conventional titanium trichlorides may be used. For example, there may be mentioned titanium trichloride treated for activation by ball mill pulverization, titanium trichloride obtained by further extracting it with a solvent, titanium trichloride obtained by treating β-type titanium trichloride with a complexing agent such as an ether, followed by treatment with titanium tetrachloride to adjust the aluminum content to a level of at most 0.15 by atomic ratio of aluminum to titanium, and titanium trichloride obtained by treating titanium tetrachloride with an organoaluminum compound in the presence of an ether to obtain a liquid product, which is then heated to obtain a solid having an aluminum content of at most 0.15 by atomic ratio of aluminum to titanium.

Among these titanium trichlorides, particularly preferred is the one which has an aluminum content of at most 0.15, preferably at most 0.1, more preferably at most 0.02, by atomic ratio of aluminum to titanium and which further contains a complexing agent.

The content of the complexing agent is at least 0.001, preferably at least 0.01, by molar ratio of the complexing agent to the titanium trichlcride in the solid titanium trichloride catalyst complex. Specifically, there may be mentioned a catalyst complex which comprises titanium trichloride, a halogenated aluminum of the formula $AlR^1_pX_{3-p}$ wherein $R^1$ is a hydrocarbon group having from 1 to 20 carbon atoms, X is a halogen atom and p is a number represented by $0 \leq p \leq 2$ with an aluminum content of at most 0.15 by atomic ratio of aluminum to titanium of the titanium trichloride, and a complexing agent in an amount of at least 0.001 by molar ratio to the titanium trichloride, such as the one represented by the formula $TiCl_3 \cdot (AlR^1_pX_{3-p})_a \cdot (C)_t$ wherein $R^1$ is a hydrocarbon group having from 1 to 20 carbon atoms, X is a halogen atom, p is a number represented by $0 \leq p \leq 2$, C is a complexing agent, a is a number of at most 0.15 and t is a number of at least 0.001. It may, of course, contain a small amount of iodine in addition to the above-mentioned $TiCl_3$ component, $AlR^1_pX_{3-p}$ component and C component as a complexing agent, or a part or whole of the titanium trichloride may be substituted by iodine or bromine, or it may contain an inorganic solid such as $MgCl_2$ or MgO as a carrier, or an olefin polymer powder such as polyethylene or polypropylene.

As the complexing agent C, an ether, a thioether, a ketone, a carboxylic acid ester, an amine, a carboxylic acid amide and polysiloxane may be mentioned. Among them, an ether or a thioether is particularly preferred. As the ether or the thioether, the ones represented by the formula R″ O-R‴ or R″-S-R‴ wherein each of R″ and R‴ is a hydrocarbon group having at most 15 carbon atoms, are preferred.

As $AlR^1_pX_{3-p}$, $AlCl_3$ and $AlR^1Cl_2$ may be mentioned.

As the solid titanium trichloride catalyst complex, particularly preferred is the one having the maximum intensity halo at the maximum intensity peak of α-type titanium trichloride ($2\theta \approx 32.9°$) in its X-ray diffraction pattern. Further, it is preferably the one which has not been subjected to a high temperature exceeding 150° C. during the preparation of the solid titanium trichloride catalyst complex. Particularly preferred is the one having a feature of a pore volume of very fine pores such that the total pore volume of pores having pore radii of from 20 to 500 Å is at least 0.02 cm³/g, preferably from 0.03 to 0.15 cm³/g, since it is thereby unnecessary to remove a non-crystalline polymer.

Such a solid titanium trichloride catalyst complex may readily be prepared by:

(a) a method of precipitating it at a temperature of not higher than 150° C. from a liquid containing titanium trichloride solubilized in the presence of an ether or thioether, or (b) a method of reducing titanium tetrachloride with an organoaluminum compound or with metal aluminum and treating the resulting solid titanium trichloride with a complexing agent and a halogenated compound.

Such methods (a) and (b) are known as disclosed in Japanese Examined Pat. Publications No. 8451/1980, No. 8452/1980, No. 24194/1978, No. 8003/1980, No. 11040/1979 and No. 28316/1979 and Japanese Unexamined Pat. Publications No. 12796/1978, No. 91794/1977, No. 116626/1980, No. 3356.1978, No. 40348/1977, No. 36928/1983, No. 12905/1984 and No. 13630/1984. Other than the methods (a) and (b), it is possible to employ a method as disclosed in Japanese Examined Pat. Publication No. 27871/1979 wherein titanium tetrachloride is reduced with an organoaluminum compound to obtain a solid titanium trichloride, then an ether compound is added in an amount of from 0.5 to 5 by molar ratio to the titanium trichloride, the mixture is heated at a temperature of from 50° to 120° C., and then the solid is separated.

The organoaluminum compound used as a cocatalyst with the above-mentioned titanium-containing solid catalyst component, is represented by the formula $AlR^2_mX_{3-m}$ wherein $R^2$ is a hydrocarbon group having from 1 to 20 carbon atoms, X is a halogen atom and m is a number represented by $3 \geq m \geq 1.5$. In a case where the titanium-containing solid catalyst component is a catalyst component supported on a carrier containing a solid magnesium compound, it is preferred to employ $AlR^2_3$ or a mixture of $AlR^2_3$ and $AlR^2_2X$.

On the other hand, in a case where the titanium-containing solid catalyst component is the one comprising titanium trichloride as the main component, $AlR^2_2X$ is usually employed, and it is usually preferred to use diethylaluminum chloride, di-n-propylaluminum chloride, dihexylaluminum chloride or di-n-octylaluminum chloride. The above titanium trichloride and organoaluminum compound are used usually in a molar ratio of the organoaluminum compound to the titanium trichloride within a range of from 1 to 30, preferably from 2 to 15.

In the present invention, the above catalyst may be used as it is. However, it is preferred to preliminarily polymerize a small amount of olefin to the catalyst comprising the titanium trichloride and the organoaluminum compound as a pretreatment. Such a pretreatment may be conducted by adding the titanium trichloride and the organoaluminum compound to an inert solvent such as hexane or heptane and supplying and polymerizing thereto an olefin such as propylene, ethylene or butene-1 or a mixture of such olefins. Such pretreatment is generally referred to as preliminary polymerization. For such preliminary polymerization, conventional polymerization conditions may be employed without any change. The polymerization temperature is usually from 30° to 70° C. The higher the polymerization degree per unit weight of the titanium trichloride, the better. However, from the viewpoint of the apparatus or economy, the polymerization degree is usually within a range of from 0.1 to 100 g-polymer/g-TiCl₃. A molecular weight modifier such as hydrogen may be added during the preliminary polymerization. Further, the preliminary polymerization is preferably conducted uniformly by a batch system. This preliminary polymerization is effective for an improvement of the properties of the polymer such as the bulk density.

The above-mentioned catalyst comprising titanium trichloride and the organoaluminum compound may further contain as a third component an additive for an improvement of the stereo regularity. For this purpose, there may be employed various electron donating compounds containing a nitrogen atom, an oxygen atom, a phosphorus atom or a silicon atom, or hydrocarbon compounds.

Such electron donating compounds may be compounds having at least one electron donating atom or group, such as an ether, a polyether, an alkylene oxide, a furan, an amine, a trialkylphosphine, a triarylphosphine, a pyridine, a quinoline, a phosphoric acid ester, a phosphoric acid amide, a phosphine oxide, a trialkyl phosphite, a triaryl phosphite, a ketone, a carboxylic acid ester and a carboxylic acid amide. Among them, preferred are a carboxylic acid ester such as ethyl benzoate, methyl benzoate, phenyl acetate or methyl methacrylate, a glycine ester such as dimethylglycine ethyl ester or dimethylglycine phenyl ester, and a triaryl phosphite such as triphenyl phosphite or trinonylphenyl phosphite.

Further, as the third component, an aromatic hydrocarbon such as benzene, toluene or xylene may also be employed.

Such a third component is usually added in an amount within a range of from 0.0001 to 5, preferably from 0.001 to 1, by molar ratio to the titanium trichloride.

The polymerization method for the main polymerization of propylene in the first step may be conducted by a conventional slurry polymerization, by a slurry polymerization in a liquid monomer or by a gas phase polymerization. Such polymerization may be conducted either by a batch system or a continuous system, and the reaction conditions are usually under a pressure of from 1 to 100 atm, preferably from 5 to 40 atm, at a temperature of from 50° to 90° C., preferably from 60° to 80° C. In the slurry polymerization, an inert hydrocarbon solvent commonly employed for the usual olefin polymerization, such as an aliphatic hydrocarbon, an alicyclic hydrocarbon or an aromatic hydrocarbon, is usually used as the polymerization medium. It is preferred to employ n-hexane, n-heptane, cyclohexane, benzene or toluene. Further, propylene itself may be used as the medium.

Further, as a method for regulating the molecular weight of the resulting polymer, a conventional molecular weight modifier such as hydrogen or diethyl zinc may suitably be added during the polymerization reaction.

The monomer for the polymerization of the first step of the present invention may be propylene alone or a combination of propylene with a small amount of other α-olefin. Said other α-olefin may be an α-olefin such as ethylene, butene-1 or 4-methylpentene-1, and its amount should be small so the resulting product does not lose the characteristics as a propylene polymer, for example, at a level of at most 10% by weight relative to propylene.

The propylene polymer obtained by the first step polymerization is transferred to the second step gas phase polymerization reactor without deactivating the catalyst contained and after or without removing a part of the reaction medium. Namely, when the polymer is the one obtained by a solvent polymerization method, the inert hydrocarbon and unreacted monomer are removed by means of a centrifugal separator or by a liquid cyclone. When liquid propylene itself is used as the medium, a similar conventional solid-liquid separating means may be employed, or the product may be supplied to the gas phase polymerization reactor as it is.

The most important technical feature of the present invention is that by the addition of at least one compound selected from an aromatic carboxylic acid ester, a phosphorous ester, an unsaturated dicarboxylic acid diester, an amine compound and an amide compound afresh to the second step gas phase polymerization system, the formation of a low molecular weight polymer of an α-olefin monomer such as ethylene or propylene is suppressed, whereby the adhesion to the inner wall of the reactor, the agglomeration phenomenon and the deterioration of the powder properties can be presented, and formation of a good fluidized layer and stabilized operation can be attained.

The aromatic carboxylic acid ester which may be used in the present invention, includes benzoic acid esters such as methyl benzoate, ethyl benzoate, propyl benzoate, butyl benzoate, nucleus-substituted benzoic acid esters such as methyl toluate, ethyl toluate, propyl toluate, butyl toluate, methyl ethylbenzoate, ethyl ethylbenzoate, ethyl xylenecarboxylate, methyl anisate, ethyl anisate, methyl ethoxybenzoate and ethyl ethoxybenzoate, aromatic polybasic carboxylic acid esters such as dimethyl phthalate, diethyl phthalate, dipropyl phthalate and dibutyl phthalate.

The phosphorous ester includes phosphorous aliphatic esters such as methyl phosphite, triethyl phosphite and tripropyl phosphite, phosphorous alicyclic esters such as tricyclohexyl phosphite, and phosphorous aromatic esters such as triphenyl phosphite.

The unsaturated dicarboxylic acid diester compound includes dimethyl maleate, diethyl maleate, di-n-propyl maleate, di-n-nonyl maleate, dimethyl fumarate, diethyl fumarate, di-t-butyl fumarate, di-n-octyl fumarate, dimethyl citraconate, dimethyl glutaconate and dimethyl itaconate.

The amine compound includes aliphatic primary amines such as n-propylamine, isopropylamine, n-butylamine, isobutylamine, sec-butylamine, tert-butylamine, cyclohexylamine and allyl amine, aromatic primary amines such as aniline, o-toluidine, m-toluidine, p-toluidine and benzylamine, secondary amines such as ethyleneimine, diethylamine, di-n-propylamine, diisopropylamine, dibutylamine, pyrrole, piperidine and 2,2,6,6-tetramethyl piperidine, and tertiary amines such as triethylamine, tri-n-butylamine, pyridine, quinoline and N,N-dimethylaniline. Further, polyamines such as ethylenediamine, piperazine and hexamethylene tetramine, may also be used.

The amide compound includes formamide, N-methylformamide, N,N-dimethylformamide, acetamide, N-methylacetamide, N,N-dimethylacetamide, acrylamide, N,N-dimethylacrylamide, acetanilide, benzanilide, urea, 1,1,2,2-tetramethylurea and e-caprolactam.

Such an aromatic carboxylic acid ester, a phosphorous ester, an unsaturated dicarbcxylic acid diester, an amine compound or an amide compound is usually different from the electron donating compound used in the polymerization of propylene in the first step, but it may be the same as the electron donating compound used in the first step. Namely, so long as it provides good polymerization properties (such as polymerization activities and stereo regularity) in the propylene polymerization system of the first step, it may be added to the first step as the third component and also to the gas phase polymerization system of the second step.

Such a compound may be supplied directly to the gas phase reactor or may be dissolved in or diluted with an inert hydrocarbon solvent or liquid propylene before supplying it to the reactor. Otherwise, it may be supplied directly to the α-olefin or the gas mixture of propylene and other α-olefin or it may be dissolved in or diluted with an inert hydrocarbon solvent or liquid propylene before supplying it thereto.

The amount of the compound to be used varies depending upon the amount of the organoaluminum compound present in the gas phase polymerization system. However, the compound is used usually in a molar ratio of the compound to the organoaluminum compound within a range of from 0.0001 to 1, preferably from 0.001 to 0.5, the molar ratio being relative to the organoaluminum compound supplied in the first step or relative to the total amount of the organoaluminum compounds added in the first and second steps in the case where the organoaluminum compound is added also in the gas phase polymerization of the second step (e.g. Japanese Examined Pat. Publication No. 7464/1980 and Japanese Unexamined Pat. Publications No. 30686/1978 and No. 151713/1981). If the amount is too much, the polymerization activities in the gas phase polymerization tend to decrease, such being undesirable. On the other hand, if the amount is too small, no adequate effect for controlling the formation of the low molecular weight polymer will be obtained.

Further, the method of the present invention may be employed also in a method wherein an inert hydrocarbon is added afresh to the gas phase polymerization of the second step (e.g. Japanese Unexamined Pat. Publication No. 31905/1982) or a method wherein a silicon compound is added (e.g. Japanese Pat. Application No. 173456/1986), whereby the effect of the present invention will be obtained.

In the present invention, as the α-olefin polymerized or copolymerized in the gas phase, an α-olefin having from 2 to 8 carbon atoms, preferably ethylene or a mixture of ethylene and propylene, may be employed.

The gas phase polymerization is conducted usually at a temperature of from 30° to 100° C. under a pressure of from 1 to 50 kg/cm$^2$, and the polymerization or copolymerization is conducted so that the polymerization proportion of the second step α-olefin block ccpolymer portion in the entire polymer will be from 3 to 50% by weight, preferably from 10 to 30% by weight. In a preferred embodiment wherein a gas mixture of ethylene and propylene is used, the gas composition is usually such that propylene is from 10 to 90 mol %, prefereably from 20 to 80 mol %, relative to the sum of ethylene and propylene.

The method of the present invention basically comprises a first step of poymerizing propylene, or propylene and a small amount of other α-olefin to obtain a propylene polymer and a second step of conducting the gas phase polymerization of other α-olefin, or propylene and other α-olefin. However, in the present invention, the α-olefin gas phase polymerization of the second step may be conducted in a plurality of steps, and further the polymerization temperature, the hydrogen concentration, the monomer composition and the reaction ratio may be differentiated from one reactor to another.

In the present invention, there is no particular restriction as to the apparatus to be used for the gas phase polymerization of the second step. Conventional apparatus such as a fluidized bed, an agitation tank, a fluidized bed with stirrer and a mobile bed, may preferably be employed, and the polymerization may be conducted continuously or in a batch system.

After completion of the gas phase polymerization, the polymer withdrawn continuously or stepwise, may be subjected to deactivating treatment or deashing treatment with an alkylene oxide or with an alcohol or water, or to removal of a non-crystalline polymer by a solvent, as the case requires.

The method of the present invention is characterized in that by the addition of at least one compound selected from the group consisting of an aromatic carboxylic acid ester, a phosphorous ester, an unsaturated dicarboxylic acid diester, an amine compound and an amide compound to the gas phase polymerization system of the second step, the formation of a low molecular weight polymer of an α-olefin causing adhesion or deposition can be suppressed, whereby excellent powder properties are obtainable, and an excellent flowability can be attained without adhesion to the wall of the reactor or the agglomeration phenomenon, the operation can be conducted for a long period of time under a stabilized condition from the viewpoint of both the process and the quality, and yet the polymerization performance such as the activity in the gas phase polymerization is not substantially affected.

Now, the present invention will be described with reference to Examples. However, it should be understood that the present invention is by no means restricted to such specific Examples.

In the following Examples and Comparative Examples, the bulk density and the n-hexane extraction residue were measured by the following methods.

(1) Bulk density: Measured in accordance with JIS K-6721

(2) n-Hexane extraction residue: The amount of the residue (% by weight) when extracted for 3 hours with boiling n-hexane by means of an improved type Soxhlet extractor.

EXAMPLE 1

(A) preparation of solid titanium trichloride

Into an autoclave having a capacity of 10 liters thoroughly flushed with nitrogen at room temperature, 5.15 liters of purified toluene was introduced. Under stirring, 651 g (5 mols) of n-butyl ether, 949 g (5 mols) of titanium tetrachloride and 286 g (2.4 mols) of diethylaluminum chloride were added thereto to obtain a brown uniform solution.

Then, the solution was heated to 40° C., and upon expiration of 30 minutes, precipitation of purple colored fine particulate solid was observed. The solution was kept for 2 hours at 40° C.

Then, 315 g of titanium tetrachloride was added thereto, and the mixture was heated to 98° C. and maintained at 98° C. for about 1 hours. Then, the particulate purple solid was separated and washed with n-hexane to obtain about 800 g of solid titanium trichloride.

(B) Preparation of propylene polymer-containing titanium trichloride (pretreatment)

Into a 10 liter autoclave thoroughly flushed with nitrogen, 5 liters of purified n-hexane was introduced, and 195 g of diethylaluminum chloride and the solid titanium trichloride obtained in the above step (A) in an amount of 250 g as $TiCl_3$ were charged. Then, while maintaining the temperature at 40° C., 250 g of propylene gas was blown to he gas phase for about 60 minutes under stirring for catalytic treatment.

Then, the solid component was sedimented, and the supernatant was removed by decantation, and the solid component was washed a few times with n-hexane to obtain a propylene polymer-containing solid titanium trichloride.

(C) Preparation of propylene-ethylene block copolymer

Two reactors equipped with stirrers and having capacities of 1,000 liters and 400 liters, respectively, were connected in series (the first and second reactors), and a gas phase polymerization reactor (the third reactor) of agitation fluidized type having a capacity of 1,500 liters was connected thereto in series. In the first and second reactors, homopolymerization of propylene was conducted in liquefied propylene, and then in the third reactor, copolymerization of the polymer from the second reactor with propylene and ethylene was conducted by gas phase polymerizaiton, as follows.

To the first reactor, liquefied propylene, 4.0 g/hr of the catalyst component obtained in the above step (B), 10 g/hr of diethylaluminum chloride as the cocatalyst, 0.52 g/hr of methyl methacrylate and 0.15 kg/hr of hydrogen as a molecular weight modifier, were continuously supplied. The polymerization temperature was 70° C. in the first reactor and 67° C. in the second reactor. From the first reactor, the slurry was continuously withdrawn and supplied to the second reactor. The average retention time was 4.0 hours in the total of the retention time in the first and second reactors.

To the third reactor, the polymer slurry from the second reactor was continuously supplied, and the gas phase polymerizaiton was conducted at a temperature of 60° C. under a pressure of 15 kg. The composition of ethylene and propylene in the gas phase was adjusted to be propylene/(ethylene+propylene)=65 mol % and $H_2$/(ethylene+propylene)=15 mol %. Further, to the recycling gas of this gas phase polymerizaiton system, 0.78 g/hr of methyl toluate was supplied.

The average retention time in this gas phase reactor was 2.5 hours. The polymer powder continuously withdrawn from the third reactor was separated from the unreacted gas and then treated with a vapor of propylene oxide to obtain a polymer powder at a rate of 45 kg/hr.

this operation was conducted continuously for 14 days, during which the operation was stable throughout the entire system. After completion of the operation, the reactor was opened, and no adhesion in the reactor or no agglomeration was observed. No formation of an oily substance was observed in the following Comparative Example 1, was observed.

The polymerization ratio of the homopolymerization to the copolymerization in the polymer thus obtained was 85/15 on an average. The bulk density of the powder was 0.45 g/cc and the n-hexane extraction residue was 97.8%.

COMPARATIVE EXAMPLE 1

Continuous operation for 14 days were conducted in the same manner as in Example 1 except that no methyl toluate was supplied to the gas polymerization system in Example 1.

During the operation, formation of an oily substance was observed at the lower portion of the dispersing plate of the gas phase reactor, and there was a tendency that the pressure loss of the dispersing plate increased as time passed. Further, the bulk density of the polymer powder obtained was as low as 0.38 to 0.40 g/cc, and the n-hexane extraction residue was also low at a level of 92.6%.

After completion of the operation, the reactor was opened, whereby deposition of adhesive substance and adhesion of fine particles were observed at the upper portion of the free board part of the reactor, and formation of agglomerates were observed around the shaft portion and the stay portion of the stirring vanes. Further, a deposition was observed also on the dispersing plate.

EXAMPLE 2

Continuous operation for 14 days was conducted in the same manner as in Example 1 except that the amount of methyl toluate added to the gas phase polymerization system in Example 1 was changed to 0.39 g/hr.

During the period, the operation was stable throughout the entire system. After completion of the operation, the reactor was opened, whereupon no formation of agglomerates was observed, although some deposition within the reactor was observed.

The bulk density of the polymer powder obtained was 0.43 g/cc and the n-hexane extraction residue was 96.8%.

EXAMPLE 3

Continuous operation for 14 days was conducted in the same manner as in Example 1 except that the compound added to the gas phase polymerization system in Example 1 was changed to 0.71 g/hr of methyl benzoate.

During the period, the operation was stable throughout the entire system. After completion of the operation, the reactor was opened, whereby no adhesion within the reactor or no agglomerates were observed and no formation of an oily substance as observed in the preceeding Comparative Example, was observed.

The bulk density of the polymer powder thus obtained was 0.44 g/cc and the n-hexane extraction residue was 97.5%.

EXAMPLE 4

Continuous operation was conducted in the same manner as in Example 1 except that the compound added to the gas phase polymerization system in Example 1 was changed to 1.6 g/hr of triphenyl phosphite.

The operation was continued for 30 days, during which the operation was stable throughout the entire system. After completion of the operation, the reactor was opened, whereby no adhesion within the reactor or no agglomerates were observed, and no formation of an oily substance as observed in he preceeding Comparative Example, was observed.

The weight ratio of the homopolymer to the copolymer in the polymer thus obtained was 85/15 on an average. The bulk density of the powder was 0.46 g/cc, and the n-hexane extraction residue was 97.2%.

EXAMPLE 5

Continuous operation was conducted in the same manner as in Example 1 except that the compound added to the gas phase polymerization system in Example 1 was changed to 0.75 g/hr of dimethyl maleate.

The operation was continued for 14 days, during which the operation was stable throughout the entire system. After completion of the operation, the reactor was opened, whereby no adhesion within the rector or no agglomerates were observed, and no formation of an oily substance as observed in Comparative Example 1, was observed.

The weight ratio of the homopolymer to the copolymer in the polymer powder thus obtained was 86/14 on an average. The bulk density of the powder was 0.45 g/cc and the n-hexane extraction residue was 97.4%.

EXAMPLE 6

Continuous operation for 14 days was conducted in the same manner as in Example 5 except that the amount of dimethyl maleate added to the gas phase polymerization system in Example 5 was changed to 0.37 g/hr.

During the period, the operation was stable throughout the entire system. After completion of the operation, the reactor was opened, whereby no formation of agglomerates was observed, although some deposition within the reactor was observed.

The bulk density of the polymer powder thus obtained was 0.43 g/cc, and the n-hexane extraction residue was 96.8%.

EXAMPLE 7

Continuous operation for 14 days was conducted in the same manner as in Example 5 except that the unsaturated dicarboxylic acid diester added to the gas polymerization system in Example 5 was changed to 0.75 g/hr of dimethyl fumarate.

During the period, the operation was stable throughout the entire system. After completion of the operation, the reactor was opened, whereby no adhesion within the reactor or no agglomerates were observed, and no formation of an oily substance as observed in Comparative Example 1, was observed.

The bulk density of the polymer powder thus obtained was 0.44 g/cc, and the n-hexane extraction residue was 97.3%.

EXAMPLE 8

Continuous operation was conducted in the same manner as in Example 1 except that the compound added to the gas phase polymerization system in Example 1 was changed to 0.53 g/hr of triethylamine.

The operation was continued for 14 days, during which the operation was stable throughout the entire system. After completion of the operation, the reactor was opened, whereby no adhesion within the reactor or no agglomerates were observed, and no formation of an oily substance as observed in Comparative Example 1, was observed.

The weight ratio of the homopolymer to the copolymer in the polymer powder thus obtained was 86/14 on an average. The bulk density of the powder was 0.44 g/cc and the n-hexane extraction residue was 97.6%.

EXAMPLE 9

Continuous operation for 14 days was conducted in the same manner as in Example 8 except that the amount of the triethylamine added to the gas phase polymerization system in Example 8 was changed to 0.27 g/hr.

During the period, the operation was stable throughout the entire system. After completion of the operation, the reactor was opened, whereby no formation of agglomerates was observed although some deposition within the reactor was observed.

The bulk density of the polymer powder thus obtained was 0.43 g/cc, and the n-hexane extraction residue was 96.8%.

EXAMPLE 10

Continuous operation for 14 days was conducted in the same manner as in Example 8 except that 0.53 g/hr of triethylamine added to the gas phase polymerization system in Example 8 was changed to 0.73 g/hr of 2,2,6,6-tetramethylpiperidine.

During the period, the operation was stable throughout the system. After completion of the operation, the reactor was opened, whereby no deposition within the reactor or no agglomerates were observed, and no formation of an oily substance as observed in Comparative Example 1, was observed.

The bulk density of the polymer powder thus obtained was 0.46 g/cc, and the n-hexane extraction residue was 97.5%.

EXAMPLE 11

Continuous operation for 14 days was conducted in the same manner as in Example 8 except that 0.53 g/hr of triethylamine added to the gas phase polymerization in Example 8 was changed to 0.52 g/hr of N,N-dimethylacrylamide.

During the period, the operation was stable throughout the entire system. After completion of the operation, the reactor was opened, whereby no adhesion within the reactor or no agglomerates were observed, and no formation of an oily substance as observed in Comparative Example 1, was observed.

The bulk density of the polymer powder thus obtained was 0.44 g/cc, and the n-hexane extraction residue was 97.2%.

The present inventors have found that the adhesion, etc. within the reactor is caused by the formation of an oily substance or a low molecular weight polymer of e.g. ethylene or propylene by the action of an organoaluminum component, and have conducted various model experiments as shown by the following Examples 12 to 16 and Comparative Examples 2 to 4 to make clear the formation of such an oily substance or a low molecular weight polymer and the effects of the specific compounds of the present invention for suppressing such formation.

EXAMPLES 12 to 16 and COMPARATIVE EXAMPLES 2 to 4

Into an autoclave having a capacity of 2 liters, predetermined amounts of diethylaluminum chloride or ethylaluminum sesquichloride and a compound as identified in Table 1 were charged. Then, 300 g of liquefied propylene, and ethylene and hydrogen were introduced thereto, and catalytic treatment was conducted at a temperature of 70° C. for 6 hours while controlling the propylene composition in the gas phase to be [propylene/(propylene+ethylene)]G=65 mol % and the hydrogen composition in the gas phase to be [hydrogen/(propylene+ethylene)]G=5 mol %.

Immediately before the completion of the reaction, the gas phase gas was sampled and analyzed for the composition, whereby the formation of butene, pentene, hexene and their isomers was observed.

After the completion of the reaction, propylene was gradually purged, and 100 ml of n-hexane was supplied to the autoclave to dilute the organoaluminum. Then, the autoclave was opened, and the residue was recovered. To this residual n-hexane solution, 100 ml of dilute hydrochloric acid was added to decompose the organoaluminum. Then, the n-hexane phase was separated, and after removing the n-hexane component, the residual oily substance was analyzed for the amount by weight and the structure. The amount is shown in Table 1.

As shown in Table 1, when the cases wherein the same organoaluminum compound is employed are compared, in the Examples wherein the specific compounds of the present invention such as an aromatic carboxylic acid ester, an amine compound, etc. were used, the formation of an oily substance was substantially suppressed, while in Comparative Example 3 wherein methyl methacrylate used for the improvement of the stereo specificity in e.g. Example 1(c), was used as the additive, the formation of an oily substance reversely increased. The above model experiments show that the specific compounds used in the present invention are fundamentally different in their function and effects from a so-called third component for polymerization which is usually employed for the improvement of the stereo specificity.

in a final stage, polymerizing an α-olefin other than propylene, or a combination of propylene and another α-olefin in the gas phase without deactivating the catalyst employed in the previous stage while adding at least one compound selected from the group consisting of an aromatic carboxylic acid ester, a phosphorus ester, an unsaturated dicarboxylic acid diester, an tertiary amine and an amide compound to the gas phase, but substantialy without adding any amount of a titanium-containing solid catalyst component.

2. The method according to claim 1, wherein the polymerization catalyst is composed of titanium trichloride and a dialkylaluminum chloride.

3. The method according to claim 1, wherein the polymerization catalyst comprises a solid titanium trichloride catalyst complex having an aluminum content of at most 0.15 by atomic ratio of aluminum to titanium and containing a complexing agent, and an organoaluminum compound.

4. The method according to claim 1, wherein the polymerization catalyst is a solid titanium trichloride catalyst complex wherein a total pore volume of pores having pore radii of from 20 to 500 Å is at least 0.02 cm$^3$/g as measured by a mercury porosimeter.

5. The method according to claim 1, wherein the polymerization catalyst is a solid titanium trichloride catalyst complex precipitated at a temperature of at most 150° C. from a liquid containing titanium trichloride solubilized in the presence of an ether or thioether.

6. The method according to claim 1, wherein the polymerization catalyst is a solid titanium trichloride catalyst complex obtained by reducing titanium tetrachloride with an organoaluminum compound or with

TABLE 1

| | Unit | Example 12 | Example 13 | Example 14 | Example 15 | Example 16 | Comparative Example 2 | Comparative Example 3 | Comparative Example 4 |
|---|---|---|---|---|---|---|---|---|---|
| Organoaluminum compound | g | DEAC 3.9 | DEAC 3.9 | DEAC 3.9 | EASC 4.0 | EASC 4.0 | DEAC 3.9 | DEAC 3.9 | EASC 4.0 |
| Additive | g | Methyl toluate 0.097 | 2,2,6,6-Tetramethyl piperidine 0.091 | Triethyl-amine 0.065 | 2,2,6,6-Tetramethyl piperidine 0.091 | Triethyl-amine 0.065 | — | Methyl methacrylate 0.065 | — |
| Gas phase composition [P/(P + E)]G | mol % | 64 | 66 | 67 | 61 | 61 | 63 | 67 | 66 |
| [H$_2$/(P + E)]G | mol % | 3.4 | 3.7 | 2.8 | 6.7 | 7.0 | 5.0 | 6.6 | 9.5 |
| Reaction temp. | °C. | 70 | 70 | 70 | 70 | 70 | 70 | 70 | 70 |
| Reaction time | hr. | 6 | 6 | 6 | 6 | 6 | 6 | 6 | 6 |
| Gas phase olefins (C$_4$=,C$_5$=,C$_6$=) | mol % | 0.06 | 0.0001 | 0.01 | 0.10 | 0.04 | 0.69 | 5.13 | 0.76 |
| Recovered oily substance | g | 0.022 | 0.024 | 0.004 | 0.10 | 0.22 | 0.08 | 0.12 | 1.72 |

According to the present invention, formation of a low molecular weight polymer can be suppressed without reducing the polymerization activity, whereby the adhesion to the inner wall of the reactor or the agglomeration phenomenon can be eliminated and an excellent flowable state can be attained, and thus stable operation for a long period of time can be made possible from the viewpoint of both the process and the quality of the product.

I claim:

1. A method for producing a propylene-α-olefin block copolymer, which comprises:
    in a first stage polymerizing propylene in the presence of a catalyst; and then metal aluminum and treating the resulting solid titanium trichloride with a complexing agent and a halogenated compound.

7. The method according to claim 2, wherein said catalyst comprises a titanium-containing solid catalyst component and an organoaluminum compound, and said at least one compound is supplied in a molar ratio of said at least one compound to said organoaluminum compound within a range of from 0.0001 to 1, the molar ratio being relative to the amount of said organoaluminum compound supplied in the first step or relative to the total amount of said organoaluminum compound added in the first and second steps in the case wherein said organoaluminum compound is added also in the gas phase polymerization of the second step.

8. The method of claim 18, wherein said at least one compound is an aromatic carboxylic acid ester.

9. The method of claim 8, wherein said aromatic carboxylic ester is at least one member selected from the group consisting of methyl benzoate, ethyl benzoate, propyl benzoate, butyl benzoate, methyl toluate, ethyl toluate, propyl toluate, butyl toluate, methyl ethylbenzoate, ethyl ethylbenzoate, ethyl xylenecarboxylate, methyl anisate, ethyl anisate, methyl ethoxybenzoate, ethyl ethoxybenzoate, dimethyl phthalate, diethyl phthalate, dipropyl phthalate, and dibutyl phthalate.

10. The method of claim 1, wherein said at least one compound is a phosphorous ester.

11. The method of claim 10, wherein said phosphorous ester is at least one member selected from the group consisting of methyl phosphite, triethyl phosphite, tripropyl phosphite, tricyclohexyl phosphite, and triphenyl phosphite.

12. The method of claim 1, wherein said at least one compound is an unsaturated dicarboxylic acid diester.

13. The method of claim 12, wherein said unsaturated dicarboxylic acid diester is at least one member selected from the group consisting of dimethyl maleate, diethyl maleate, di-n-propyl maleate, di-n-nonyl maleate, dimethyl fumarate, diethyl fumarate, di-t-butyl fumarate, di-n-octyl fumarate, dimethyl citraconate, dimethyl glutaconate, and dimethyl itaconate.

14. The method of claim 1, wherein said at least one compound is an amine.

15. The method of claim 1, wherein said at least one compound is an amide.

16. The method of claim 15, wherein said amide is at least one member selected from the group consisting of formamide, N-methylformamide, N,N-dimethylformamide, acetamide, N-methylacetamide, N,N-dimethylacetamide, acrylamide, N,N-dimethylacrylamide, acetanilide, benzanilide, urea, 1,1,2,2-tetramethylurea and e-caprolactam.

* * * * *